US006932851B2

(12) United States Patent
Bocarsly et al.

(10) Patent No.: US 6,932,851 B2
(45) Date of Patent: Aug. 23, 2005

(54) METHODS FOR THE PREPARATION OF METALLIC ALLOY NANOPARTICLES AND COMPOSITIONS THEREOF

(75) Inventors: Andrew B. Bocarsly, Plainsboro, NJ (US); Shu Zhu, Princeton, NJ (US)

(73) Assignee: The Trustees of Princeton University, Princeton, NJ (US)

( * ) Notice: Subject to any disclaimer, the term of this patent is extended or adjusted under 35 U.S.C. 154(b) by 0 days.

(21) Appl. No.: 10/287,456

(22) Filed: Nov. 4, 2002

(65) Prior Publication Data

US 2003/0140731 A1 Jul. 31, 2003

Related U.S. Application Data

(60) Provisional application No. 60/336,054, filed on Nov. 2, 2001.

(51) Int. Cl.$^7$ .................................................. B22F 9/24
(52) U.S. Cl. .............................. 75/351; 75/365; 75/369
(58) Field of Search .......................... 75/351, 365, 369

(56) References Cited

U.S. PATENT DOCUMENTS

| | | | | |
|---|---|---|---|---|
| 5,913,117 A | * | 6/1999 | Lee ............................ | 438/240 |
| 6,066,581 A | * | 5/2000 | Chivukula et al. ............ | 501/12 |
| 6,203,768 B1 | | 3/2001 | McCormick et al. .......... | 423/1 |
| 6,254,662 B1 | | 7/2001 | Murray et al. ................ | 75/348 |
| 6,300,144 B1 | * | 10/2001 | Wouters et al. ............... | 438/3 |
| 6,432,472 B1 | * | 8/2002 | Farrell et al. ................. | 427/79 |
| 2001/0009118 A1 | | 7/2001 | Hosoe et al. | |

FOREIGN PATENT DOCUMENTS

| | | |
|---|---|---|
| JP | 01-215393 | 8/1989 |
| JP | 02-163327 | 6/1990 |
| WO | WO 02/32589 | 4/2002 |

OTHER PUBLICATIONS

Bocarsly, et al., "Microscopic and Bulk Properties of Cyanogel Systems: A Novel Aqueous Sol–Gel System Based on the Chemistry of Transition Metal Cyanometalate Complexes," Abstract HH1.8, Materials Research Society, Spring '99 meeting, San Francisco, CA, Apr. 5–7, 1999.
Gonsalves, et al., "Chemical Synthesis of Nanostructured Metals, Metal Alloys, and Semiconductors," in Handbook of Nanostructured Materials and Nanotechnology, vol. 1, Synthesis and Processing, 1–55 (H.S. Nalwa ed., Academic Press 2000).
Heibel et al., Chem. Mat., 1996, 8:1504.
Sun, et al., "Monodisperse FePt Nanoparticles and Ferromagnetic FePt Nanocrystal Superlattices," Science, vol. 287, Mar. 17, 2000, pp. 1989–1992.
Suslick, et al., "Applications of Ultrasound to Materials Chemistry," Annu. Rev. Mater. Sci., 1999, 29:295–326.
Zhu, et al., "A New Synthesis of Chemically Interesting Nano Particles Using Cyanogel Chemistry," Poster Session, Princeton University, May 2001.

* cited by examiner

Primary Examiner—George Wyszomierski
(74) Attorney, Agent, or Firm—McCarter & English, LLP

(57) ABSTRACT

A method of producing metal alloy nanoparticles comprising forming a cyanosol by reacting a mixture of a chlorometallate complex and a cyanometallate complex, spin-coating the mixture onto a substrate to form a film, and sintering the film to form metal alloy nanoparticles.

11 Claims, 6 Drawing Sheets

METHODS FOR THE PREPARATION OF METALLIC ALLOY NANOPARTICLES AND COMPOSITIONS THEREOF

RELATED APPLICATIONS

This application claims the priority of Provisional Patent Application Ser. No. 60/336,054, filed Nov. 2, 2001, the entire disclosure of which is expressly incorporated herein by reference.

FIELD OF THE INVENTION

The present invention relates to methods of synthesis of metal alloy nanoparticles and thin films composed of metal alloy nanoparticles.

BACKGROUND OF THE INVENTION

Alloys based on precious metals are of special importance for their catalytic and magnetic properties useful in information storage media, magnetic refrigeration, audio reproduction and magnetic sealing. Transition metals such as palladium, platinum and cobalt are well known for their catalytic capabilities in bulk and deposited phases. Such alloys can be fabricated through bulk metal processes or through nanoparticle synthesis.

Presently available methods for synthesis of bulk metal alloys include physical methods such as mechanical deformation, thermalization of amorphous alloys, inert gas evaporation, and sputtering; and chemical methods such as reduction using $NaBH_4$, $NaBEt_3H$, alkali or alkaline earth metals, alcohol, sonichemical synthesis (Suslick and Price, *Annu. Rev. Mater. Sci.*, 1999, 29:295–326), thermal decomposition and electrochemical methods.

These methods are complicated and demanding, typically involving sophisticated instrumentation. They also suffer from disadvantages such as contamination from mechanical parts. Although the chemical methods offer advantages over physical methods, such as chemical homogeneity at the molecular level, these methods also have disadvantages such as contamination from reaction byproducts, agglomeration and difficulty in scalability. (K. E. Gonsalves et al., Chemical Synthesis of Nanostructured Metals, Metal Alloys and Semiconductors, in *Handbook of Nanostructured Materials and Nanotechnology, Vol. 1, Synthesis and Processing*, 1–55 (H. S. Nalwa ed., Academic Press, 2000)).

An alternate method of synthesizing bulk metal alloys has been disclosed. This method involves the formation of a cyanogel through the reaction of a tetrachlorometallate with a transition metal cyanometallate complex in an aqueous environment (Heibel et al., *Chem. Mat.*, 1996, 8:1504).

Presently, methods of synthesis known for synthesizing metallic nanoparticles include mechanical methods, such as grinding large particles, and chemical reduction in which a reducing agent, such as sodium borohydride, is used to reduce a dissolved metal ion species to a metallic particle. The latter approach usually involves the introduction of a surface-protecting agent into the solution so that the formed particles do not agglomerate. Both of these techniques are satisfactory for the production of metal nanoparticles of a single metal; however, they have serious shortcomings if an alloy nanoparticle, i.e., a nanoparticle of a homogenous solution of two or more metals, is the desired product. The differences in reaction rates and mechanical properties of the metals, due for example to the different redox potentials of the metals, limit the ability of the metals to form true alloy particles. Typically, when a mild reducing agent is employed in an effort to make alloy nanoparticles, a mixture of single-metal particles is obtained, rather than metal alloy particles. Even in cases where the desired alloy does form, the proportions of the metals in the particles vary widely. Further, the presence of trace surface-absorbed organics on the metallic particles from the use of surface-protecting agents significantly impairs the catalytic properties of the metallic particles.

Alloy metal particles in the nanometer range are key components of materials such as heterogeneous chemical catalysts and magnetic recording media (tapes and disk drives). Thus, a method of reproducibly synthesizing well-defined, non-agglommerated metal alloy particles of controlled size and composition are highly desired and as yet not readily available.

SUMMARY OF THE INVENTION

The present invention provides a method for synthesizing metal alloy nanoparticles. The method comprises reacting a chlorometallate complex with a transition metal cyanometallate complex to form a cyanosol. The cyanosol is spin-cast to form a thin film. The thin film is then sintered under inert atmosphere to form nanosized metal alloy particles.

The invention further provides metal alloy nanoparticles produced by reacting a chlorometallate complex with a transition metal cyanometallate complex to form a cyanosol. The cyanosol is spin-cast to form a thin film. The thin film is then sintered under inert atmosphere to form the nanosized metal alloy particles.

The methods of the invention can be applied to a variety of metal alloy systems. The methods reproducibly control particle size. The metal alloy nanoparticles of the invention have dimensions that range from about 3 nm to 100 nm. The final composition of the metal alloy nanoparticles closely mimics the stoichiometry of the starting cyanosol polymer, thus specific chemical compositions are easily produced.

Because the reaction is a thermal solid-state process, that is, the process does not require the presence of liquids or reactive gases, no surface-protecting agent is required for the synthesis of nanoparticles. Thus the cyanosols may be directly applied to a variety of substrates. Desired particle size and size distribution can be achieved by controlling the reaction temperature of the cyanosol, the spin-coating rotation rate, and the thermal processing of the thin film to form nanoparticles.

The nanoparticles and films produced by the method of the invention have paramagnetic and/or ferromagnetic properties suitable for use in high-density magnetic memory applications. Because the particles have clean metal surfaces, the nanoparticles also have catalytic properties and may be used as catalysts for the conversion of carbon dioxide into less harmful materials and for hydrogen and oxygen evolution from water.

BRIEF DESCRIPTION OF THE DRAWINGS

FIG. 4 shows in FIG. (4A)—a TEM image of Pd/Co nanoparticles produced by mixing 0.06M starting reagents at 0° C. and sintering at 650° C. as described in Example 4; and in FIG. (4B)—the particle size distribution for particles produced as described in Example 4.

FIG. 5 shows in FIG. (5A)—a TEM image of Pd/Co nanoparticles produced by mixing 0.006M starting reagents at 0° C. and sintering the spin-coated film at 650° C. as described in Example 5; and in FIG. (5B)—the particle size distribution for particles produced as described in Example 5.

FIG. 6 shows in FIG. (6A)—a TEM image of Pd/Co nanoparticles produced by mixing 0.06M starting reagents at 90° C. and sintering the spin-coated film at 870° C. as described in Example 6; and in FIG. (6B)—the particle size distribution for particles produced as described in Example 6.

DETAILED DESCRIPTION OF THE INVENTION

The present invention is partially based on the discovery that the methods used for forming bulk metal alloys through the formation of a bridging cyanometallate sol phase, referred to as a cyanosol, may be used to produce metal alloy particles of nanometer dimensions.

A cyanosol is a suspension of colloidal particles in water. The particles are composed of an inorganic coordination polymer composed of bridging cyanide ligands between two transition metal (or between a transition metal and a post-transition metal) cation centers. The metal associated with the nitrogen end of the cyanide ligand is ligated in a trans configuration having two cyanide ligands and two chloride ligands. The metal bound to the carbon end of the cyanide is in an octahedral, square planar, or eight coordinate cyanide ligand field. The stoichiometry of the two metal complexes that form the coordination polymer range from 3:1 to 2:1.

At the molecular level a cyanogel is the same as the cyanosol. However, the cyanogel has a very distinct 2:1 stoichiometry mimicking the stoichiometry of the starting metal complexes. More importantly, the gel consists of two continuous phases that both fill the reaction container, an aqueous phase that contains dissolved reaction by-product salts and the coordination polymer phase.

The invention provides methods for the controlled formation of metal alloy particles having nanometer dimensions containing two or more homogeneously dispersed metals through the formation of a cyanosol. Using the methods of the invention, nanoparticle alloys of palladium-cobalt, palladium-platinum, and platinum-cobalt, as well as other metals may be produced. The nanoparticles range in size from 3 nm to 100 nm and have a 3:1 ratio of components.

The present invention also provides a method of forming a metal alloy thin film. The film has a thickness of from 30 nm to 60 nm and is comprised of metal alloy particles having a uniform dispersity, the particles ranging in size from about 3 nm to 100 nm.

A thick gel may also be formed using the methods of the invention. The thick films have a thickness of 100 nm or greater which comprises two or more layers of spin-coated metal alloy cyanosol having uniform particle sizes of up to 100 nm.

The methods of the invention involve the reaction of aqueous solutions of chlorometallate complexes with cyanometallate complexes.

The chlorometallate compounds include transition and nontransition metals, including but not limited to Pd, Pt, Ru, Ir and Sn. The chlorometallate complexes are preferably tri- or tetrachlorometallate complexes. Preferred chlorometallate complexes include $[PdCl_4]^{2-}$, $[PtCl_4]^{2-}$, $RuCl_3$, $IrCl_3$ and $SnCl_4$.

The cyanometallate complexes include, but are not limited to, complexes having the metals Co, Fe, Ru, Os, Cr, Pt, Pd, Pt, Mn, Ni, Mo and W. Preferred cyanometallate complexes include the potassium or sodium salts of (Co $(CN)_6)^{3-}$, $(Fe(CN)_6)^{3-}$, $(Fe(CN)_6)^{4-}$, $(Fe(CN)_5(L))^{3-}$, (Ru $(CN)_6)^{3-}$, $(Os(CN)_6)^{3-}$, $(Cr(CN)_6)^{3-}$, $(Pt(CN)_6)^{3-}$, (Pd $(CN)_6)^{3-}$, $(Pt(CN)_4)^{2-}$, $(Pd(CN)_4)^{2-}$, $(Mn(CN)_6)^{4-}$, (Ni $(CN)_4)^{2-}$, $(Mo(CN)_8)^{4-}$ and $(W(CN)_8)^{4-}$.

The general procedure of forming bulk metal alloys, which are typically about 1 $mm^3$ or larger in size, involves the formation of a cyanosol, via the reaction of a chlorometallate complex with a cyanometallate complex in aqueous solution in a 2:1 ratio at 0° to 90° C. Typically the reaction is performed at ambient temperature. The reagent concentrations may range from 1 mM to 1 M, however, preferably are at a concentration of about 50–70 mM. After mixing, the solution is allowed to stand undisturbed until gelation occurs, forming a cyanogel. This step is typically performed at room temperature, however, for more concentrated gels, the temperature may be reduced to temperatures as low as 0° C. Up to one liter of bulk gel volume may be formed in this manner. The gels are aged for about 3 hours to one day, and then formed into xerogels by heating to drive off the water. The heating time will depend on the volume of the gel. The resulting xerogel is a free flowing powder having low water content and the intact coordination polymer. The dried xerogel is placed in a tube furnace and heated at a temperature of between about 400° C. and 1000° C., for about one hour, under a flow of argon or nitrogen gas until conversion to the bulk metal product. The time of heating will depend on the volume of the gel. Using this same methodology, bulk metal alloys comprising three or more metals may also be synthesized.

The present invention provides a method of synthesizing nanoparticles of metal alloys comprising forming a cyanosol via the reaction of equimolar aqueous solutions of a chlorometallate complex with a cyanometallate complex in a 3:1 ratio. Typically, the reaction is performed at ambient temperature, however the reaction may take place at 0° to 90° C. The reagent concentrations are preferably in the range of about 6 mM to 120 mM.

Once the sol product has formed, but prior to the formation of a cyanogel, the material is spin-coated onto a solid-state substrate to form a thin film. Typically, a volume of 0.25 ml is spin-coated over a 5 $cm^2$ substrate by dosing the surface with 0.05 ml aliquots over a 10 s time period. The thin films may have a thickness of about 40–50 nm.

Spin-coating on a substrate to form the films is performed at about 3000 to 4000 rpm or a speed suitable to generate a homogeneous dispersion of well-defined (non-agglomerated) sol particles. The sol particles are observed to be individual using transmission electron microscopy. The particles typically have similar shapes (spherical) and tend to pack together to form a two dimensional superlattice. Clumps of particles (i.e., aggregates) are not observed.

The thin film is allowed to air dry at room temperature and is then heat-treated under an inert atmosphere such as nitrogen or argon gas to produce the desired metal alloy nanoparticles. The thermal processing, or sintering, is carried out in a tube furnace with temperatures ranging from about 250° C. to 1000° C.

The thermal processing temperature will depend on the initial reagents employed, the desired size of the alloy product particles, and the desired dispersity of particles (i.e., the desired particle size distribution) in the film. In general, lower processing temperatures produce smaller particles with a narrower size distribution. Lowering the reagent solution concentrations leads to the formation of monodispersed particles, i.e., all particles are approximately the same size. Although the reagents are typically mixed at room temperature, a further decrease in particle size may be obtained by cooling the original reagent solutions to 0° C. prior to mixing these solutions to make the sol phase. The specific temperature that the sol is formed at is a function of the ligand substitution rate of the chlorometallate complex utilized. Similar adjustments in sol formation temperature and sintering temperature may be made as the initial chlorometallate reagent is varied. Changing the cyanometallate reagent has typically been found to have little impact on the required sol formation temperature.

Various end applications for the nanoparticles may benefit from different particle sizes. For example, in the area of heterogeneous catalysis, large surface area is important. Since smaller particles have a larger surface to volume ratio the smallest possible particles are found to be most suitable for this purpose. Similarly, the magnetic properties of a material vary depending upon not only the specific metal composition, but also on the size of the particles. The particle size would be selected to match the size of the magnetic domain. Larger size particles are more ferromagnetic. Smaller particles of a bulk ferromagnetic material however are paramagnetic and are attractive for certain applications of paramagnetic materials, such as the production of giant magnetoresistive materials, e.g., recording heads. The distribution (or dispersity) of particle sizes is likewise a consideration in selecting particles for these specific applications. In these applications, compositions that contain monodispersed particles have been found to provide an improved result.

Thick films may be produced by repeating the spin-coating process. After one thin film layer on the substrate surface has dried, another film is spin-coated on the surface. In this manner up to 10 or more layers may be applied, forming a thick film.

Using the above methods for forming metal alloy nanoparticles, nanoparticles comprising alloys of three or more metals may be synthesized.

Metal alloy products are analyzed by FTIR spectroscopy (Nicolet 730 and Nicolet 800 FTIR spectrometers), thermal gravimetric analysis (Perkin Elmer TGA-7), and elemental analysis. Nanoparticles are characterized by transmission electron microscopy (TEM) using a Philips CM200 FEG-TEM. Metal content of the products is determined by (1) digestion of the sample with strong base and analysis by ICP spectroscopy and (2) electron microprobe analysis using a CAMECA SX-50.

The products of the invention may be prepared on a variety of substrates including Pyrex glass, quartz, single crystal silicon, glassy carbon, pyrolytic graphite, calcium fluoride and nickel.

The products of the invention are useful as catalysts for the generation of hydrogen, oxygen from water, and in the development of photochemical systems for the splitting of water and in the development of carbon monoxide resistant, hydrogen-oxygen fuel cells.

The nanoparticles are also useful in permanent magnetic applications, in the production of thin film media for high density magnetic recordings, and in optical and electronic devices.

The examples described below indicate how the individual constituents of the preferred compositions and the conditions for applying them function to provide the desired results. The examples will serve to further typify the nature of this invention but should not be construed as a limitation to the scope thereof which scope is defined solely in the appended claims.

EXAMPLES

TEM analysis of the particle showed that the particles were non-agglommerated. The TEM image was used to directly measure particle size. Electron microprobe analysis of the nanoparticles showed that the nanoparticles were homogeneous mixtures of the metal alloys and had a 3:1 stoichiometry.

All chemicals employed were reagent grade. Water for solution preparation was deionized and reverse osmosis purified using an in-house system. Thin films were formed using a Chemat Technologies Spin Coater (Model KW-4A) (Chemat Technologies, Los Angeles, Calif.). Films were formed on a variety of substrates: Pyrex glass, quartz, single crystal silicon, glassy carbon, pyrolytic graphite, calcium fluoride and nickel which were between 1–5 $cm^2$ in area. Product alloys were characterized by Transmission Electron Microscopy using a Philips CM200 FEG-TEM. Precise metal complexes ($Na_2PdCl_4$, $K_2PtCl_4$ and $K_2PtCl_6$) were purchased from Pressure Chemical Co., Pittsburgh Pa. Cyanometallate complexes were obtained from Aldrich, St. Louis Mo. All compounds were used as received with no further purification.

Example 1

Metal Alloy Formation Using Cyanogels

A. Synthesis of Cyanogels: Bulk cyanogels were synthesized by the reaction of an aqueous solution of $Na_2PdCl_4$ (Pressure Chemical Co.) with the potassium or sodium salt of one of the following cyanometallate complexes: (Co $(CN)_6)^{3-}$, $(Fe(CN)_6)^{3-}$, $(Fe(CN)_6)^{4-}$, $(Fe(CN)_5L)^{3-}$, $(Cr(CN)_6)^{3-}$, $(Mn(CN)_6)^{4-}$, $(Ru(CN)_6)^{3-}$, $(Os(CN)_6)^{3-}$, $(Co(CN)_6)^{3-}$, $(Pt(CN)_4)^{2-}$, $(Pd(CN)_4)^{2-}$, $(Ni(CN)_4)^{2-}$, $(Mo(CN)_8)^{4-}$, and $(W(CN)_8)^{4-}$. Cyanometallate complexes were purchased from Aldrich, except for the Mo and W complexes which were synthesized using procedures described in N H Furman and C O Miller, *Inorganic Synthesis,* Vol. 3, 160 (L F Audrieth, ed., McGraw-Hill, 1950). In all cases, equimolar (molarity ranging from 5 mM to 0.9 mM) aqueous solutions of $Na_2PdCl_4$ and the cyanometallate of interest were prepared, 20 ml of the chloropalladate solution was mixed with 10 ml of the cyanometallate solution, and the mixture was reacted at room temperature. After mixing the solutions were allowed to stand undisturbed until gelation occurred forming a gel having approximately 30 ml of volume.

The cyanogel products were analyzed by FTIR spectroscopy (Nicolet 730 and Nicolet 800 FTIR spectrometers), thermal gravimetric analysis (Perkin Elmer TGA-7) which confirmed the coordinate polymer structure of the gel; and elemental analysis, which confirmed the stoichiometry of the polymer.

B. Synthesis of Bulk Metal Alloys: The gels formed in A above were aged for one day and then formed into xerogels by heating in a microwave oven (standard kitchen oven rated at 450W) to drive off the water. For a 30 ml volume of gel, 10 minutes of heating at full power formed the xerogel. The dried xerogel was placed in a tube furnace and heated for one hour at 700° and 1000° C. under a flow of argon gas until conversion to product.

C. Synthesis of Bulk Metal Alloys Containing Three Metals: A ternary alloy gel was formed by reacting two cyanometallate complexes with a chlorometallate complex. A volume of 5 ml of 60 mM $K_3Fe(CN)_6$ was mixed with 5 ml of a 60 mM $K_3(Co(CN)_6)$ solution and the mixture was reacted with 20 ml of a 60 mM $Na_2PdCl_4$ solution to produce a homogeneous three metal coordination polymer form and gel. Processing at 650° C. produced a Pd/Co/Fe alloy in a 2:1:1 stoichiometry.

Example 2

Synthesis of 31 nm Pd/Co Alloy Nanoparticles

Aqueous solutions of 0.06 M $Na_2PdCl_4$ (Pressure Chemical Co.) and 0.06 M $K_3Co(CN)_6$ (Aldrich) were mixed at 3:1 ratio at ambient temperature. Immediately after mixing, the mixture was quickly spin-coated onto a substrate at 3000 rpm to form a thin film. A volume of 0.25 ml was coated over a 5 cm$^2$ substrate by dosing the surface with 0.05 ml aliquots over a 10 s period. The film was allowed to dry at room temperature, and was then sintered at 650° C. under a flow of argon by placing the sample in a three zone furnace (Carbolite TZF 12/65/550) at room temperature and heating to 650° C. over a three hour period. The sample was then held at the sinter temperature for one hour and allowed to cool down to room temperature in the furnace (overnight) under a flow of argon. Pd/Co alloy particles having an average diameter of 31 nm±20 nm were formed.

Figure 1:
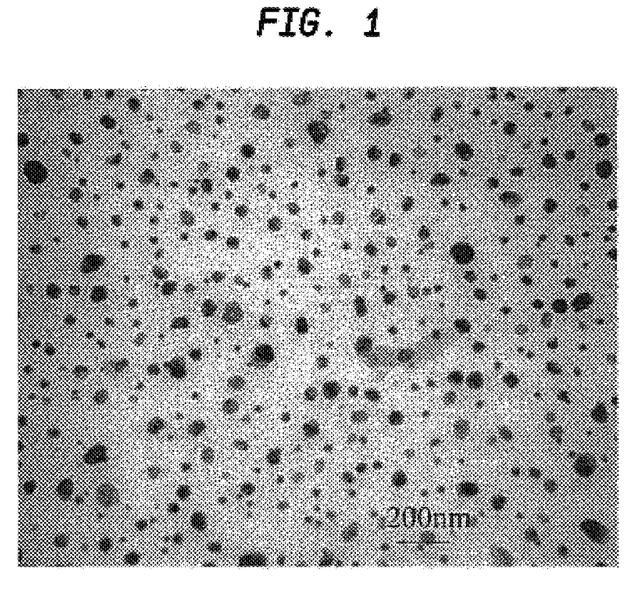
FIG. 1 shows a TEM image of Pd/Co nanoparticles produced by mixing 0.06M starting reagents and sintering the spin-coated film 650° C. as described in Example 2.
Figure 3:
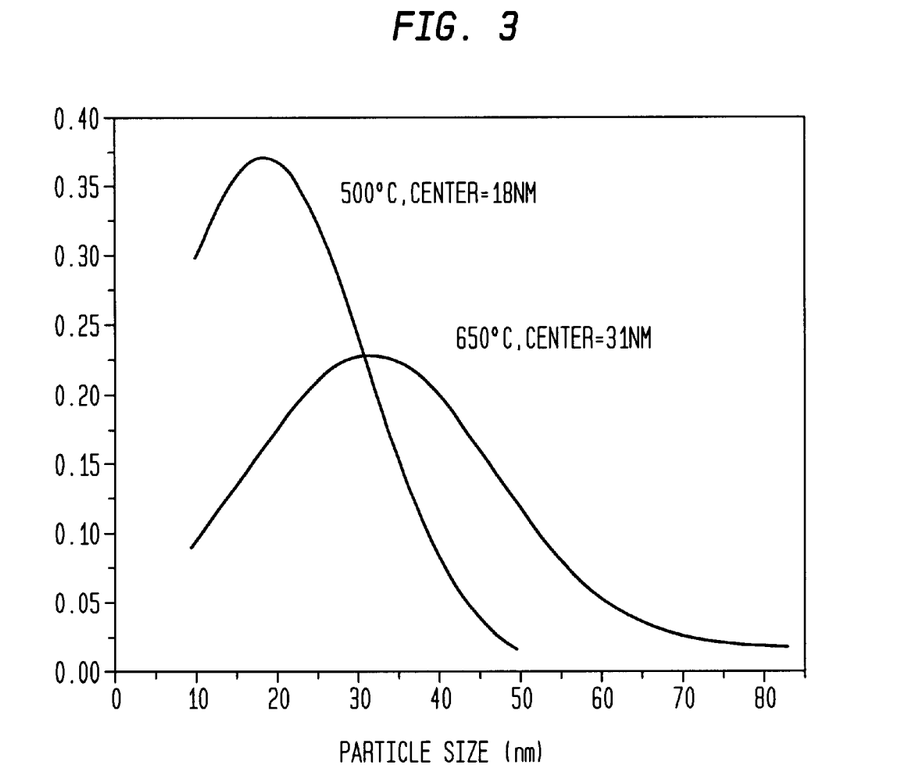
FIG. 3 shows a comparison of the particle size distribution of Pd/Co nanoparticles produced by the methods described in Example 2 (film sintered at 650° C., particles of average 31 nm size) and Example 3 (film sintered at 500° C., particles of average 18 nm size).

FIG. 1 is the TEM image of the particles. TEM showed that the particles were non-agglommerated. The TEM image was used to directly measure particle size. The particle size distribution was plotted and is shown in FIG. 3. Electron microprobe analysis of the nanoparticles showed that the nanoparticles were homogeneous mixtures of the metal alloys and had a 3:1 stoichiometry.

Example 3

Synthesis of 18 nm Pd/Co Alloy Nanoparticles

Figure 2:
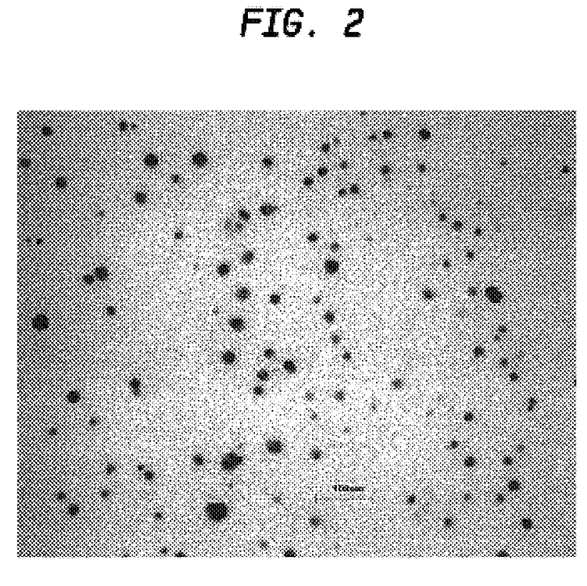
FIG. 2 shows a TEM image of Pd/Co nanoparticles produced by mixing 0.06M starting reagents and sintering the spin-coated film at 500° C. as described in Example 3.

Aqueous solutions of 0.06 M $Na_2PdCl_4$ and 0.06 M $K_3Co(CN)_6$ were mixed at 3:1 ratio at ambient temperature. Immediately after mixing, the mixture was quickly spin-coated onto a substrate at 3000 rpm to form a thin film. A volume of 0.25 ml was coated over a 5 cm$^2$ substrate by dosing the surface with 0.05 ml aliquots over a 10 s period. The film was allowed to dry at room temperature, and was then sintered at 500° C. under a flow of argon by placing the sample in a three zone furnace (Carbolite TZF 12/65/550) at room temperature and heating to 500° C. over a three hour period. The sample was then held at the sinter temperature for one hour and allowed to cool down to room temperature in the furnace (overnight) under a flow of argon. Polydispersed Pd/Co alloy particles having an average diameter of 18 nm±14 nm were formed (see TEM analysis in FIG. 2). The particle size distribution is shown in FIG. 3. Electron microprobe analysis of the nanoparticles showed that the nanoparticles were homogeneous mixtures of the metal alloys and had a 3:1 stoichiometry.

This results show that altering the sintering temperature (while other conditions remained the same) produced smaller sized particles.

Example 4

Synthesis of 12 nm Pd/Co Alloy Nanoparticles

Figure 4A:
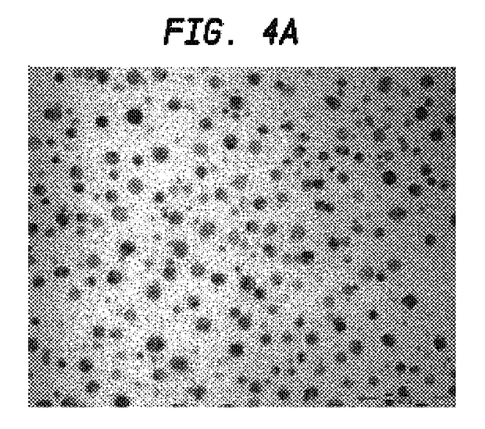
Figure 4B:
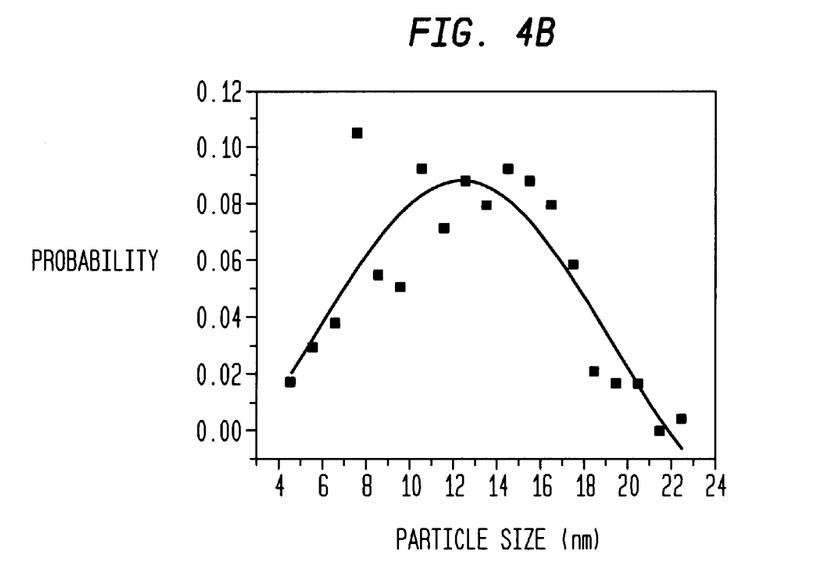

Aqueous solutions of 0.06 M $Na_2PdCl_4$ and 0.06 M $K_3Co(CN)_6$ were mixed at 3:1 ratio at 0° C. Immediately after mixing, the mixture was quickly spin-coated onto a substrate at 3000 rpm to form a thin film. A volume of 0.25 ml was coated over a 5 cm$^2$ substrate by dosing the surface with 0.05 ml aliquots over a 10 s period. The film was allowed to dry at room temperature, and was then sintered at 650° C. under a flow of argon as described in Example 2 to yield a mean alloy particle diameter of 12 nm±6 nm (see TEM image in FIG. 4A). The particle size distribution is shown in FIG. 4B. Electron microprobe analysis of the nanoparticles showed that the nanoparticles were homogeneous mixtures of the metal alloys and had a 3:1 stoichiometry.

The results show that lowering the reaction temperature of the reagents to 0° C. from room temperature (as in Example 2) before sol formation produced smaller sized particles.

Example 5

Synthesis of 8 nm Pd/Co Alloy Nanoparticles

Figure 5A:
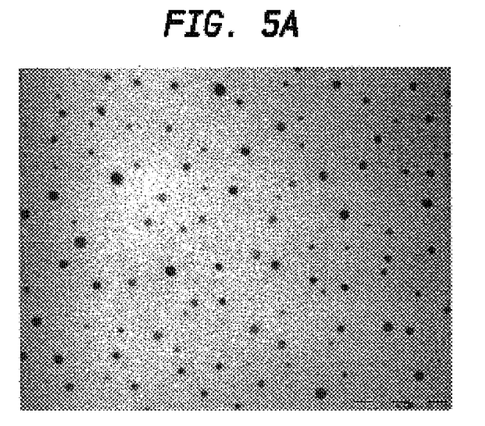
Figure 5B:
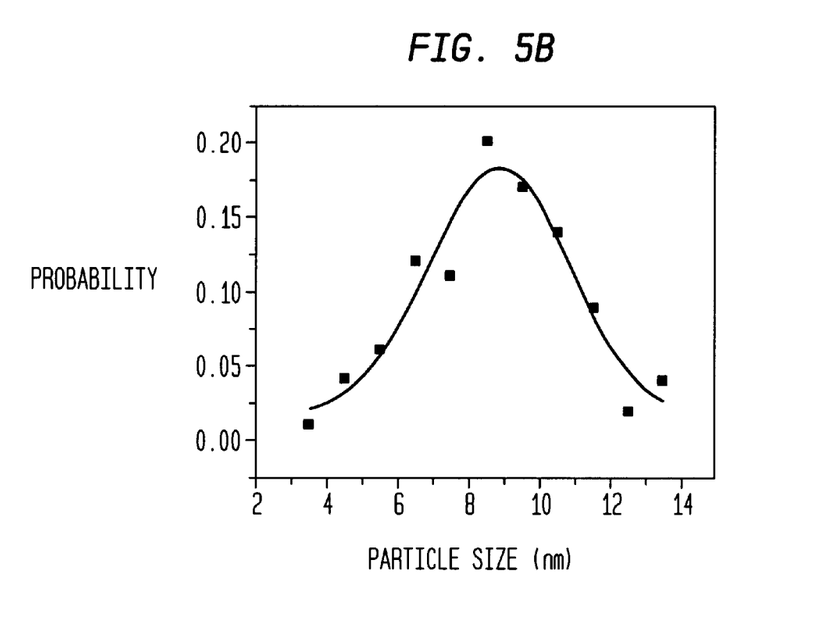

Aqueous solutions of 0.006 M $Na_2PdCl_4$ and 0.006 M $K_3Co(CN)_6$ were mixed at 3:1 ratio at 0° C. Immediately after mixing, the mixture was quickly spin-coated onto a substrate at 4000 rpm to form a thin film. A volume of 0.25 ml was coated over a 1 cm$^2$ substrate by dosing the surface with 0.05 ml aliquots over a 10 s period. The film was allowed to dry at room temperature, and was then sintered at 650° C. under a flow of argon as described in Example 2 to yield alloy particles with a diameter of 8 nm±2 nm. The TEM image of the particles is shown in FIG. 5A. The particle size distribution is shown in FIG. 5B. Electron microprobe analysis of the nanoparticles showed that the nanoparticles were homogeneous mixtures of the metal alloys and had a 3:1 stoichiometry.

The results show that decreasing the concentration of the starting cyanometallate complex produced smaller sized nanoparticles.

Example 6

Synthesis of 10 nm Pt/Co Alloy Nanoparticles

Figure 6A:
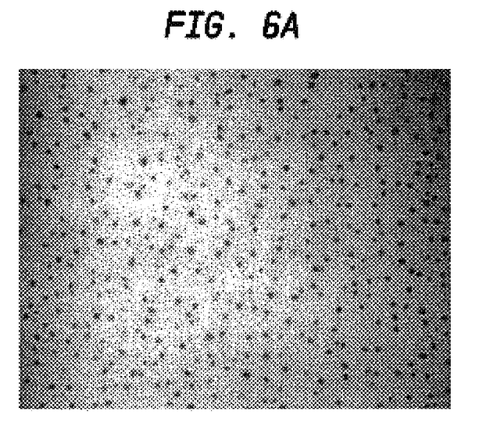
Figure 6B:
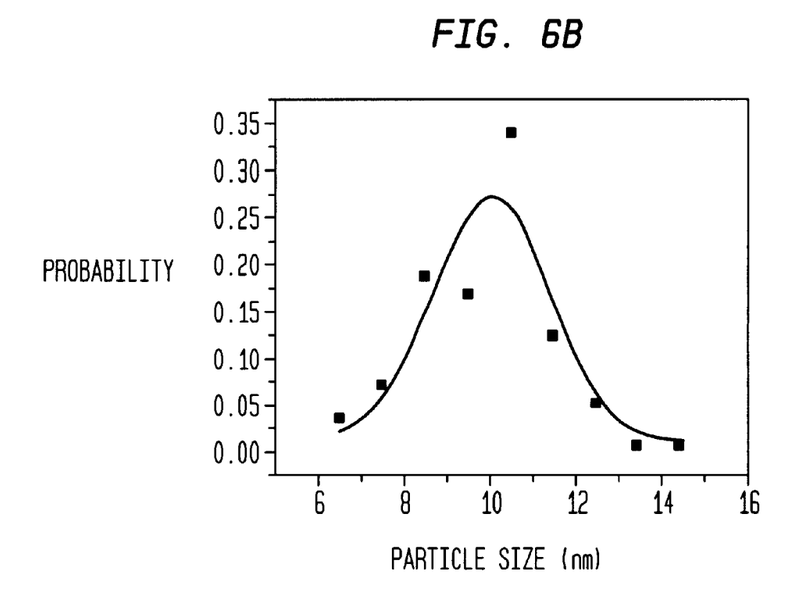

Aqueous solutions of 0.06 M $K_2PtCl_4$ (Pressure Chemical Co.) and 0.06 M $K_3Co(CN)_6$ (Aldrich) were mixed at 3:1 ratio and heated to 90° C. for 20 min. Upon cooling to room temperature, the mixture was spin-coated onto a substrate at 4000 rpm to form a thin film. A volume of 0.25 ml was coated over a 1 cm$^2$ substrate by dosing the surface with 0.05 ml aliquots over a 10 s period. The film was allowed to dry at room temperature, and was then sintered at 870° C. under a flow of argon by placing the sample in a three zone furnace (Carbolite TZF 12/65/550) at room temperature and heating to 870° C. over a three hour period. The sample was then held at the sinter temperature for one hour and allowed to cool down to room temperature in the furnace (overnight) to yield alloy particles having a diameter of 10 nm±1 nm. This is shown the TEM image in FIG. 6A. The particle size distribution is shown in FIG. 6B. Electron microprobe analysis of the nanoparticles showed that the nanoparticles were homogeneous mixtures of the metal alloys and had a 3:1 stoichiometry.

Example 7

Synthesis of Thick Film Pd/Co Alloy Nanoparticle Coating

Figure 7:
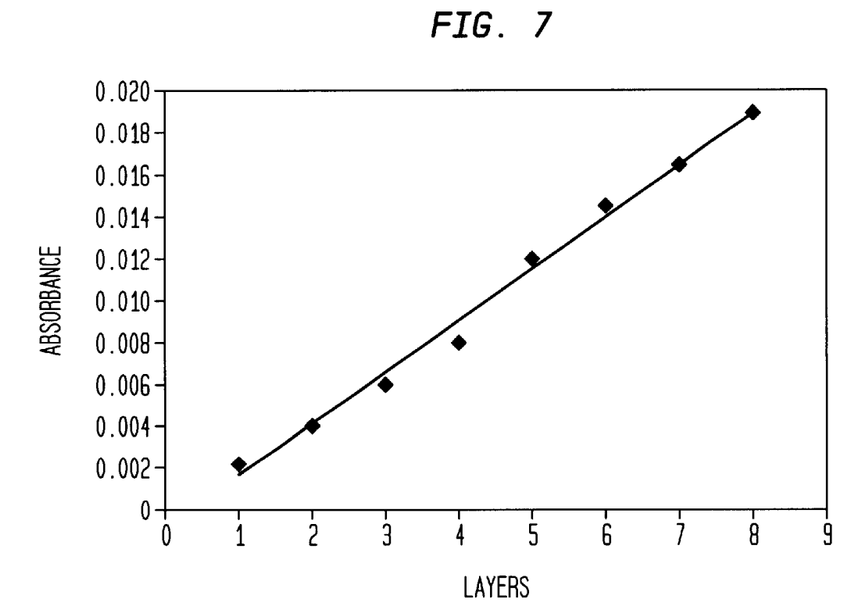
FIG. 7 shows a plot of bridging cyanide IR absorption intensity vs. the number of spin-coats applied using the method described in Example 7 to synthesize a Pd/Co alloy nanoparticle film.

Thick coatings of nanoparticles were synthesized by repeatedly using the method described in Example 2 for producing nanoparticles. That is, after a layer was spin-coated and allowed to air dry, a subsequent 0.25 ml aliquot was spin-coated onto the alloy surface. IR analysis of the cyanide stretching frequency after the application of each layer showed a linear build up of cyanosol on the substrate for up to at least ten layers. The data in FIG. 7 shows that the IR absorption intensity is directly proportional to the amount of cyanogel present. Data was obtained using a Nicolet 800 FTIR. Upon sintering at 650° C., SEM analysis showed a very homogenous coating of metallic particles having an average diameter of 100 nm.

Example 8

Nanoparticles as Catalysts

Figure 8:
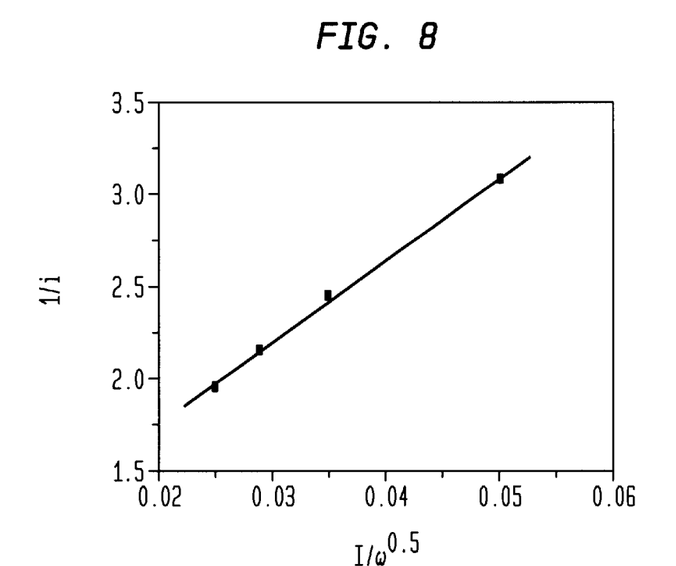
FIG. 8 show a plot of inverse current vs. the square root of the inverse of rotation rate for a Pt/Co modified glassy carbon electrode (K-L Plot). Data was obtained using a Pine Instruments digitally controlled rotating ring-disk electrode assembly and potentiostat (RRDE-4) as described in Example 8.

The use of the Pt/Co nano-alloy (3:1) produced in Example 6 as an electrocatalyst for the reduction of water to hydrogen was investigated. This experiment was carried out in a standard three electrode electrochemical cell employing a large area platinum counterelectrode and a SCE reference electrode along with the glassy carbon rotating disk electrode. A rotating disk and RDE-4 potentiostat (Pine Instruments, Grove City, Pa.) were employed. The supporting electrolyte was aqueous 0.5 M sulfuric acid. The electrode potential was scanned at 20 mV/sec. FIG. 8 shows a plot of the Levich currents measured. The data demonstrates that when the Pt/Co nanoalloy is placed on a glassy carbon electrode, a catalytic current for hydrogen evolution is observed.

Having thus described the invention in detail, it is to be understood that the foregoing description is not intended to limit the spirit and scope thereof. What is desired to be protected by Letters Patent is set forth in the appended claims.

What is claimed is:

1. A method for producing metal alloy nanoparticles, comprising:
   (a) reacting a chlorometallate complex comprising Sn with a transition metal cyanometallate complex to form a cyanosol;
   (b) spin-coating the cyanosol to form a thin film; and
   (c) sintering the film to form metal alloy nanoparticles.

2. The method of claim 1, wherein the chlorometallate complex and the cyanometallate complex are in aqueous solution.

3. The method of claim 1, wherein the concentration of the chlorometallate complex and the cyanometallate complex in aqueous solutions are equimolar.

4. The method of claim 1, wherein the sintering temperature is 250° to 1000° C.

5. The method of claim 1, wherein the chlorometallate complex and the cyanometallate complex are mixed in a 3:1 ratio.

6. The method of claim 1, wherein the nanoparticles are 3–100 nm in size.

7. A method for producing a thin film of metal alloy nanoparticles, comprising:
   (a) reacting a chlorometallate complex comprising Sn with a transition metal cyanometallate complex to form a cyanosol;
   (b) spin-coating the cyanosol onto a substrate to form a thin film of metal alloy nanoparticles.

8. The method of claim 7, wherein the chlorometallate complex and the cyanometallate complex are in aqueous solution.

9. The method of claim 7, wherein the concentration of the chlorometallate complex and the cyanometallate complex in aqueous solutions are equimolar.

10. The method of claim 7, wherein the chlorometallate complex and the cyanometallate complex are mixed in a 3:1 ratio.

11. The method of claim 7, wherein the nanoparticles are 3–100 nm in size.

* * * * *